(12) United States Patent
Kagawa

(10) Patent No.: US 6,809,924 B2
(45) Date of Patent: Oct. 26, 2004

(54) TRAY STRUCTURE FOR LOADING IN AND UNLOADING DISK FROM DISK DRIVE

(75) Inventor: Yoshiharu Kagawa, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 42 days.

(21) Appl. No.: 10/403,045

(22) Filed: Apr. 1, 2003

(65) Prior Publication Data

US 2003/0184965 A1 Oct. 2, 2003

(30) Foreign Application Priority Data

Apr. 2, 2002 (JP) ........................................ 2002-099957

(51) Int. Cl.⁷ ................................................. G06F 1/16
(52) U.S. Cl. ...................... 361/685; 360/133; 369/75.2
(58) Field of Search ......................... 361/685; 369/75.2, 369/77.1, 191, 192; 360/133, 135

(56) References Cited

U.S. PATENT DOCUMENTS

| | | | | |
|---|---|---|---|---|
| 5,784,350 A | * | 7/1998 | Akiba et al. ................ | 369/77.1 |
| 6,111,838 A | * | 8/2000 | Akiba ........................ | 369/77.1 |
| 6,628,597 B2 | * | 9/2003 | Yeh et al. .................. | 369/75.2 |

FOREIGN PATENT DOCUMENTS

| | | |
|---|---|---|
| JP | 4-12148 | 1/1992 |
| JP | 7-254199 | 10/1995 |
| JP | 10-143965 | 5/1998 |

OTHER PUBLICATIONS

Nakayama et al. (US 2001/0008510 A1), "Disk Drive", Jul. 19, 2001.*

* cited by examiner

*Primary Examiner*—Yean-Hsi Chang
(74) *Attorney, Agent, or Firm*—Wenderoth, Lind & Ponack, L.L.P.

(57) ABSTRACT

Disclosed is a tray structure for loading in and unloading a disk from a disk drive. It comprises rearward and forward parts hinged together, thereby permitting the forward part to gravitate and incline downward when the forward part is pulled out of the disk drive. The forward part has guide pieces integrally connected to its opposite sides for mating with the guide rails of the disk drive when putting the tray structure in the disk drive. The approximately two thirds of the full length of the tray is required in taking out and putting the disk on the tray, and accordingly the space allotted to the taking-off and putting-in of the disk is much smaller than the pulling-out of the tray over its whole length.

4 Claims, 3 Drawing Sheets

TRAY STRUCTURE FOR LOADING IN AND UNLOADING DISK FROM DISK DRIVE

BACKGROUND OF THE INVENTION

1. Field of the Invention

The present invention relates to a tray structure for loading in and unloading a disk from a disk drive.

2. Related Art

A disk drive is equipped with a tray for loading and unloading a CD or DVD. The disk drive has guide rails and associated rack-and-pinion. The guide rails are fixed onto the opposite longitudinal side walls of the disk drive housing, and the tray has the rack fixed to its bottom. The tray can be moved along the rails when the pinion is rotated by an associated motor. When the tray is pulled out of the disk drive, the disk can be put on or removed from the tray. In case of loading the disk drive with a disk, the disk is put on the tray, which is pulled out of the disk drive, and then, the tray is pushed in the disk drive. When reproducing, the disk is raised by the traverse holder, and the disk is rotated at a high speed by the motor.

Referring to FIG. 3, a conventional disk drive is shown with its tray 1 pulled out of the disk drive (FIG. 3a; opening position); and with its tray 1 pushed in the disk drive (FIG. 3b; closing position). In removing the disk from the tray 1 in its opening position, we have experienced that the disk on the tray has no part accessible, making it difficult to take it off.

In the hope of facilitating the taking-off of a disk from the tray JP 7-254199A has proposed a "disk drive" which is so designed that a disk may appear partly beyond one notched longitudinal side of the tray when the tray is pulled out of the disk drive, thus enabling a user to pinch and hold the projecting part of the disk by fingers for removal. Conveniently this arrangement permits access to one side of the disc for removal. In putting on a disk on the tray, however, the tray must be fully pulled out of the disk drive, and therefore, the space which needs to be allotted to the disk drive in handling the tray is relatively large, specifically, the longitudinal length of the disk drive plus the longitudinal length of the tray.

JP 10-143965A has proposed another "disk drive" which is so designed that the top cover plate may comprise a stationary sub-plate and a rotatable sub-plate hinged to the stationary sub-plate, and that the rotatable sub-plate may be responsive to the pulling-out of the tray for rotating and opening the space for putting a disk on the tray, and may be responsive to the pushing-in of the tray for rotating and closing the tray. In the opening position the disk is partly exposed to be caught for removal.

This arrangement permits a disk to be loaded or unladed in the state of the tray being partly pulled out of the disk drive, but it requires extra space large enough to allow the rotatable sub-plate to rotate and rise upright on the top of the disk drive, thus preventing other device from being laid on the disk drive.

JP 4-12148U discloses a "disk tray" having its forward part hinged to its major rearward part. The forward part is responsive to the pulling-out of the disk tray for bending, thus allowing the disk to project beyond the major part. Then, the disk can be held by pinching the projecting portion of the disk by fingers. Inconveniently the forward part must be raised by hand to be coplanar with the major part when pushing the disk tray in the disk drive.

One object of the present invention is to provide a tray structure of compact size, facilitating the loading and unloading of a disk from a disk drive.

SUMMARY OF THE INVENTION

To attain this object a tray structure for loading in and unloading a disk from a disk drive, which is equipped with guide rails to allow the tray structure to run along, is improved according to the present invention in that it comprises rearward and forward parts hinged together, thereby permitting the forward part to incline downward under influence of gravity when the forward part is pulled out of the disk drive, the forward part having guide pieces integrally connected to its opposite sides for mating with the guide rails when putting the tray structure in the disk drive.

When the tray is pulled out of the disk drive, the forward part is bent about the hinge by its weight under influence of gravity to provide the space between the disk and the inclined forward part, permitting access to the disk edge for pinching and taking off the disk from the tray with fingers. A disk can be put on the tray to push it in the disk drive, and then, the forward part is automatically raised to be coplanar with the rear part of the tray as the opposite guide pieces are slidably mate with the opposite guide rails of the disk drive. Each guide piece may have a curved end, thereby facilitating the mating of the guide pieces with the counter guide rails.

The forward part may have a notch made on its rear mid-edge, thereby facilitating access to a small-sized disk by fingers.

Other objects and advantages of the present invention will be understood from the following description of a tray structure according to one preferred embodiment of the present invention.

DETAILED DESCRIPTION OF PREFERRED EMBODIMENT

Figure 1:
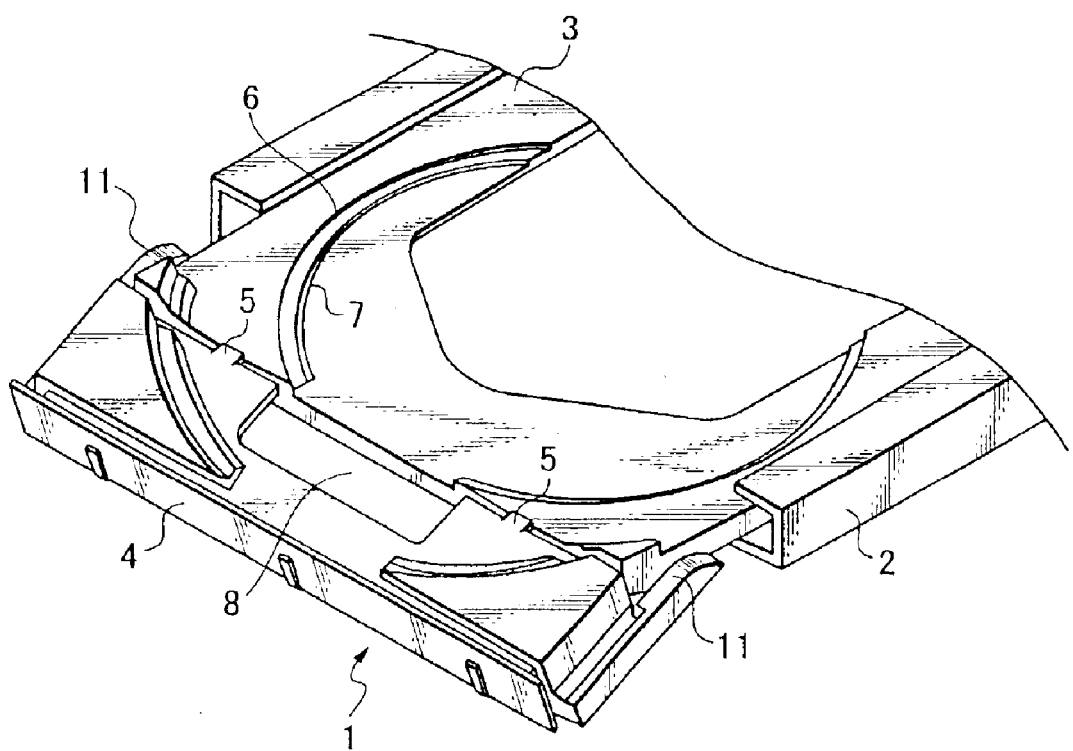
FIG. 1 is a perspective view of a tray according to the present invention in the state of being pulled out of the disk drive.

Referring to FIG. 1, a tray structure 1 according to the present invention is used for loading in and unloading a disk from a disk drive, which is equipped with guide rails 2, 2 to allow the tray structure 1 to run along. Usually the tray 1 has a rack fastened to its bottom, and an associated pinion is rotated to move the tray 1 back and forth.

Each guide rail 2 has a "U"-shape in cross section, and the opposite longitudinal sides of the tray 1 are slidably fitted in the guide rails 2. As seen from FIGS. 1 and 2, the tray 1 comprises rearward and forward parts 3 and 4 hinged together as indicated by the reference numeral 5. Thus, the forward part 4 is permitted to gravitate and incline downward by its weight when the forward part 4 is pulled out of the disk drive.

As seen from FIG. 1, the tray 1 need not be fully pulled out from the disk drive to take off the disk from the tray 1; when the tray 1 partly appears from the disk drive, say approximately two thirds of the whole body pulled out, the forward part 4 bends about the hinges 5 under the influence of gravity.

As shown, the tray 1 has a circular space 6 formed on its upper side, partly spanning the forward and rearward parts. Another circular space 7 is concentrically defined within the larger circular space 6 for accommodating a small-sized disk. The forward part 4 has a rectangular notch 8 made on its rear mid-edge. The rectangular notch 8 and the space between the inclined forward part 4 and the disk facilitate access to the disk on the rearward part 3 in taking off the disk and in putting another disk on the tray 1.

The inclined forward part 4 does not constitute any hindrance in taking off the disk and putting another disk on the tray 1. When a small-sized disk is laid in the circular space 7 of the tray 1 with its circumference partly projecting into the rectangular space of the forward part 4, thus facilitating access to the exposed circumferential part of the small-sized disk.

Figure 2A:
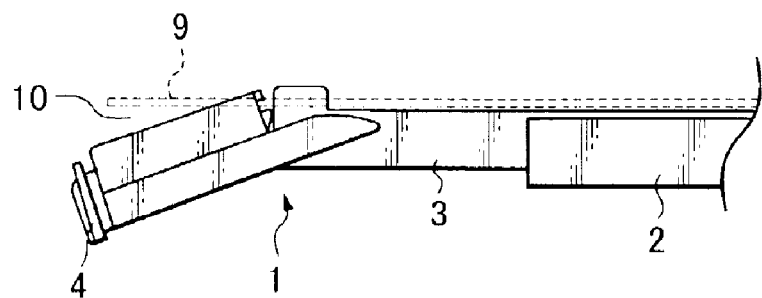
FIGS. 2(a), 2(b) and 2(c) illustrate how the forward part change in position when the tray is pushed in the disk drive.
Figure 2B:
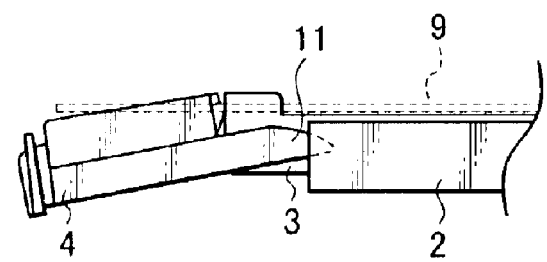
Figure 2C:
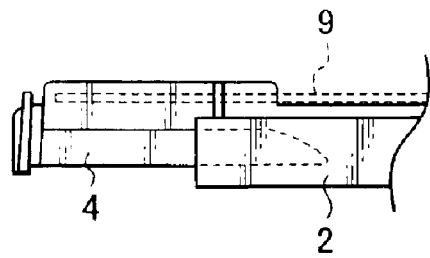
Figure 3A:
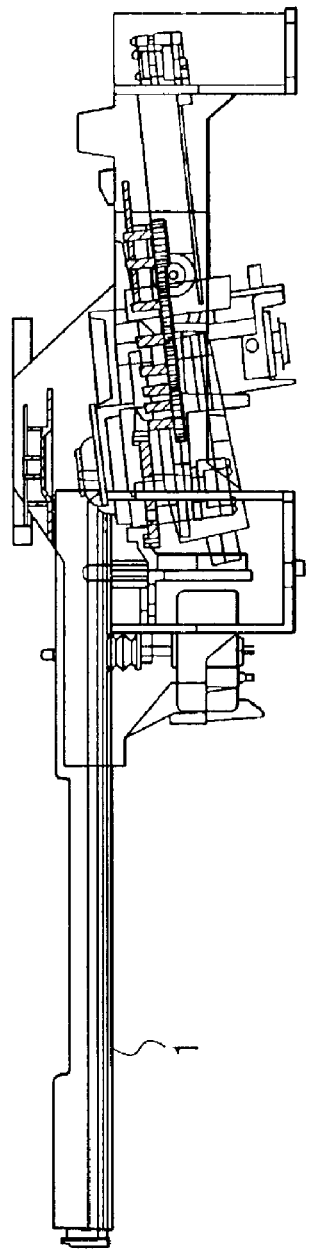
FIGS. 3(a) and 3(b) illustrate a conventional tray in the pulling-out and pushing-in positions.
Figure 3B:
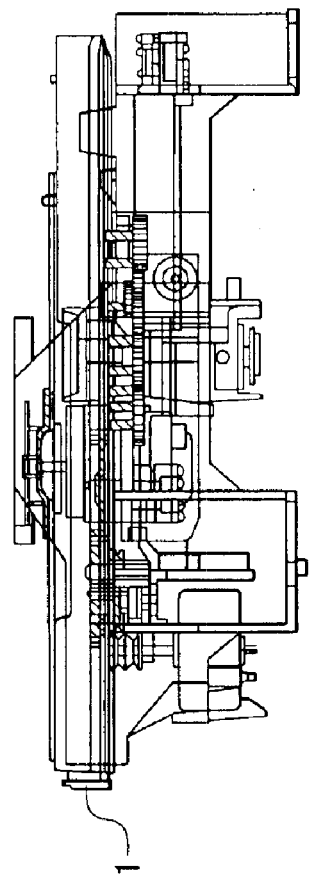

Referring to FIGS. 2(*a*), 2(*b*) and 2(*c*), the manner in which the forward part 4 of the tray 1 works is described below.

In FIG. 2(*a*), when being pulled out of the disk drive, the tray 1 runs on the opposite guide rails 2 toward its opening position, in which the forward part 4 is inclined downward under the influence of gravity, allowing the disk 9 to remain on the rearward part 3 of the tray 1, thus providing the space 10 between the inclined forward part 4 and the disk 9. When the disk 9 is removed from the tray 1, the disk 9 is caught by the projecting circumference and the center hole with fingers to be raised from the tray 1. Conversely in putting a disk 9 on the tray 1, the disk 9 is caught by the projecting circumference and the center hole with fingers to be released and laid on the tray 1.

FIG. 2(*b*) shows that the tray 1 is moved toward the closing position. The disk 9 is put in the circular space 6 of the rearward part 3 of the tray 1. As the tray 1 is pushed in the disc drive, the forward part 4 is raised toward the horizontal position.

The forward part 4 has guide pieces 11 integrally connected to its opposite sides for mating with the guide rails 2 when pushing the tray 1 in the disk drive. Each guide piece 11 has a curved end, thereby enabling it to smoothly mate with the counter guide rail 2.

Referring to FIG. 2(*c*), the tray 1 is moved just ahead of the closing position.

The tray structure according to the present invention provides the following advantages:

The forward part of the tray is responsive to the pulling-out of the tray approximately two thirds of its full length for inclining under the influence of gravity, thereby providing the space between the inclined forward part and the exposed circumference of the disk projecting forward from the rearward part of the disk. Thus, access to the disk is permitted to take it off from the tray readily. The approximately a half to two thirds of the full length of the tray is enough to permit a disk to be taken out and put on the tray, and accordingly the space allotted to the taking-off and putting-in of the disk is much smaller than the pulling-out of the tray over its whole length.

What is claimed is:

1. A tray structure for loading in and unloading a disk from a disk drive which is equipped with guide rails to allow the tray structure to run along, comprising rearward and forward parts hinged together, thereby permitting the forward part to gravitate and incline downward when the forward part is pulled out of the disk drive, the forward part having guide pieces integrally connected to its opposite sides for mating with the guide rails when putting the tray structure in the disk drive.

2. A tray structure according to claim 1, wherein each guide piece has a curved end.

3. A tray structure according to claim 2, wherein the forward part has a notch made on its rear mid-edge.

4. A tray structure according to claim 1, wherein the forward part has a notch made on its rear mid-edge.

* * * * *